(12) United States Patent
Kozaki et al.

(10) Patent No.: US 10,808,212 B2
(45) Date of Patent: Oct. 20, 2020

(54) BARLEY BEVERAGE AND METHOD RELATING TO SAME

(71) Applicant: SAPPORO BREWERIES LIMITED, Shibuya-ku (JP)

(72) Inventors: Yoichi Kozaki, Shibuya-ku (JP); Yutaka Matsuda, Shibuya-ku (JP); Tetsu Hamaguchi, Shibuya-ku (JP)

(73) Assignee: Sapporo Breweries Limited, Tokyo (JP)

( * ) Notice: Subject to any disclaimer, the term of this patent is extended or adjusted under 35 U.S.C. 154(b) by 490 days.

(21) Appl. No.: 14/772,190

(22) PCT Filed: Feb. 18, 2014

(86) PCT No.: PCT/JP2014/053793
§ 371 (c)(1),
(2) Date: Sep. 2, 2015

(87) PCT Pub. No.: WO2014/136568
PCT Pub. Date: Sep. 12, 2014

(65) Prior Publication Data
US 2016/0002577 A1    Jan. 7, 2016

(30) Foreign Application Priority Data
Mar. 5, 2013 (JP) ................................. 2013-042856

(51) Int. Cl.
*C12C 1/02* (2006.01)
*C12G 3/02* (2019.01)
*C12C 12/04* (2006.01)
*C12G 3/025* (2019.01)
*C12C 12/00* (2006.01)

(52) U.S. Cl.
CPC ................ *C12C 1/02* (2013.01); *C12C 12/00* (2013.01); *C12C 12/04* (2013.01); *C12G 3/02* (2013.01); *C12G 3/025* (2013.01)

(58) Field of Classification Search
CPC ......... C12C 12/02; C12C 5/004; C12C 7/047; C12N 9/2422; C12N 9/2457; C12Y 302/01041
See application file for complete search history.

(56) References Cited

U.S. PATENT DOCUMENTS

| | | | | |
|---|---|---|---|---|
| 4,355,047 A | * | 10/1982 | Line | C12C 5/004 426/13 |
| 4,428,967 A | * | 1/1984 | Goering | A23J 1/125 127/38 |
| 8,802,175 B2 | * | 8/2014 | Qi | A23L 7/1965 426/459 |
| 2005/0204437 A1 | * | 9/2005 | Breddam | A01H 5/10 800/320 |
| 2008/0138466 A1 | * | 6/2008 | Kishinami | C12C 1/02 426/16 |
| 2009/0208631 A1 | * | 8/2009 | Kihara | A23F 3/34 426/598 |

FOREIGN PATENT DOCUMENTS

| | | |
|---|---|---|
| CN | 87100414 A * | 8/1988 |
| JP | 2004-24151 A | 1/2004 |
| JP | 2005-124517 A | 5/2005 |
| JP | 2006-296391 A | 11/2006 |
| JP | 2009-28007 A | 2/2009 |
| JP | 2011-72253 A | 4/2011 |
| JP | 2012-213373 A | 11/2012 |

OTHER PUBLICATIONS

Coghe S. et al, Ferulic acid release and 4-vinylguaiacol formation during brewing and fermentation: indications for feruloyl esterase activity in *Saccharomyces cerevisiae*., J. Agric. Food Chem., vol. 52, No. 3, 2004, pp. 1-9.*
Office Action dated Nov. 21, 2017 in the corresponding Japanese Patent Application No. 2015-504231 (with Partial English Translation) 8 pages.
International Search Report dated May 13, 2014, in PCT/JP2014/053793 filed Feb. 18, 2014.
Ian McMurrough et al., "Control of Ferulic Acid and 4-Vinyl Guaiacol in Brewing", Journal of the Institute of Brewing, vol. 102, (1996), pp. 327-332.
Bhavna Ahluwalia et al., "Barley Endosperm Cell Walls Contain a Feruloylated Arabinoxylan and a Non-feruloylated ß-Glucan", Journal of Cereal Science, vol. 4, (1986), pp. 287-295.

* cited by examiner

*Primary Examiner* — Tamra L. Dicus
(74) *Attorney, Agent, or Firm* — Morgan, Lewis & Bockius LLP

(57) ABSTRACT

Provided are a beverage having an effectively improved flavor, and methods for the same. A method of producing a beverage according to the present invention is a method of producing a beverage using a raw material solution, the method including: washing barley without germinating the barley; discarding a wash solution after the washing of the barley; and preparing the raw material solution using a raw material containing the washed and ungerminated barley.

19 Claims, 1 Drawing Sheet

| EVALUATION | COMPARATIVE EXAMPLE 1 | EXAMPLE 1-1 | EXAMPLE 1-2 |
|---|---|---|---|
| A | 1 | 1 | 7 |
| B | 3 | 6 | 1 |
| C | 4 | 1 | 0 |
| DISCORDANT TASTE | 4 | 2 | 0 |

| EVALUATION | COMPARATIVE EXAMPLE 2 | EXAMPLE 2 |
|---|---|---|
| A | 0 | 6 |
| B | 7 | 1 |
| C | 0 | 0 |
| DISCORDANT TASTE | 4 | 0 |

BARLEY BEVERAGE AND METHOD RELATING TO SAME

TECHNICAL FIELD

The present invention is related to a beverage and methods relating to the same, and more particularly, the present invention is related to an improvement in flavor of a beverage produced using a raw material containing barley.

BACKGROUND ART

Patent Literature 1 discloses production of a malt alcoholic beverage using a raw material containing malt and barley.

CITATION LIST

Patent Literature

[Patent Literature 1] JP 2009-028007 A

SUMMARY OF INVENTION

Technical Problem

However, alcoholic beverages produced using raw materials containing barley in the prior art have unfavorable flavors originating from the barley.

The present invention has been made in view of the problem described above, and one of the objects of the present invention is to provide a beverage having an effectively improved flavor and methods relating to the same.

Solution to Problem

A method according to one embodiment of the present invention for solving the problem described above is a method of producing a beverage using a raw material solution, the method including: washing barley without germinating the barley; discarding a wash solution after the washing of the barley; and preparing the raw material solution using a raw material containing the washed and ungerminated barley. According to the one embodiment of the present invention, a method of producing the beverage having an effectively improved flavor is provided.

In addition, the above-mentioned method may include: washing the barley that has not been milled; milling the washed barley; and preparing the raw material solution using a raw material containing the milled barley. In addition, in the above-mentioned method, the washing may include washing the barley at a temperature of less than 40° C. In addition, in the above-mentioned method, the washing may include washing the barley at a temperature of 40° C. or more.

In addition, in the above-mentioned method, the washing may include washing the barley without germinating the barley so that the content of ferulic acid in the raw material solution prepared using the washed and ungerminated barley is 85% by weight or less of the content of ferulic acid in the raw material solution prepared using the unwashed and ungerminated barley.

A beverage according to one embodiment of the present invention for solving the problem described above is produced by any one of the above-mentioned methods. According to the one embodiment of the present invention, the beverage having an effectively improved flavor is provided.

A method according to one embodiment of the present invention for solving the problem described above is a method of improving a flavor of a beverage produced using a raw material containing barley, the method including using, as the barley, washed and ungerminated barley to improve the flavor of the beverage compared to a case of using unwashed and ungerminated barley instead of the washed and ungerminated barley. According to the one embodiment of the present invention, a method of effectively improving the flavor of the beverage is provided.

Advantageous Effects of Invention

According to the embodiments of the present invention, the beverage having an effectively improved flavor, and the methods relating to the same, are provided.

DESCRIPTION OF EMBODIMENTS

Figures 1, 2, 3:
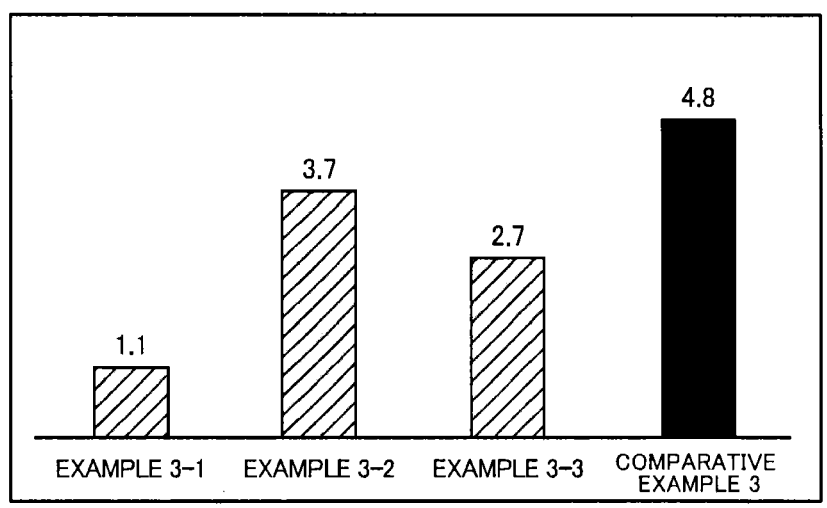
FIG. 1 is an explanatory diagram for showing one example of results of evaluation for the flavors of beverages in Example 1 according to one embodiment of the present invention.
FIG. 2 is an explanatory diagram for showing one example of results of evaluation for the flavors of beverages in Example 2 according to one embodiment of the present invention.
FIG. 3 is an explanatory diagram for showing one example of results of measurement of the content of ferulic acid in raw material solutions in Example 3 according to one embodiment of the present invention.

Hereinafter, embodiments of the present invention will be described. It should be noted that the present invention is not limited to these embodiments.

A method according to one embodiment of the present invention (hereinafter referred to as "method of the present invention") is, for example, a method of producing a beverage using a raw material solution, and the method includes: washing barley without germinating the barley; discarding awash solution after the washing of the barley; and preparing the raw material solution using a raw material containing the washed and ungerminated barley.

That is, in the method of the present invention, a beverage is produced using a raw material solution prepared using a raw material containing barley by: washing the barley in advance without germinating the barley; thereafter, discarding a wash solution; and preparing the raw material solution using the barley after the washing.

The barley to be washed is not particularly limited as long as the barley has not germinated (for example, barley that has not sprouted buds and roots). That is, the kind of the barley is not particularly limited. Any one kind of barley may be used, or any two or more kinds of barley may be used in combination.

In addition, the barley may be barley from which the hull has not been removed or barley from which at least a part of the hull has been removed. In the case of using the barley from which the hull has not been removed, for example, filtration of the raw material solution is performed with high efficiency compared to the case of using the barley from which at least a part of the hull has been removed. In addition, in the case of using the barley from which the hull has not been removed, for example, a loss of extract by washing is prevented effectively compared to the case of using the barley from which at least a part of the hull has been removed.

Conditions for washing the barley are not particularly limited as long as the conditions fall within ranges where transfer of an unfavorable flavor component originating from the barley to a beverage is suppressed without germinating the barley. That is, conditions for washing the barley without germinating the barley are not particularly limited as long as the conditions fall within ranges where the barley does not sprout buds and roots. It should be noted that, for example, when the barley is washed at a temperature of less than 40° C., the barley is preferably washed so that the water content of the barley (so-called barley steeping degree) falls within the range of less than 30% by weight. Further, for example, when the barley is washed at a temperature of 40° C. or more, the barley is preferably washed so that the water content of the barley falls within the range of 70% by weight or less.

The wash solution to be used for washing the barley may be, for example, a solvent which contains water. The water-containing solvent is not particularly limited, and may be water or a mixture of water and another solvent. It should be noted that the water-containing solvent may contain, for example, 70% by volume or more of water, 80% by volume or more of water, or 90% by volume or more of water.

The washing of the barley is performed by, for example, immersing the barley in the wash solution. That is, when the barley is immersed in the wash solution, an unfavorable flavor component originating from the barley is eluted effectively into the wash solution.

Then, after washing the barley, the wash solution used for the washing is discarded. That is, in the method of the present invention, the raw material solution is prepared using the barley separated from the wash solution without using the discarded wash solution.

Specifically, for example, the barley is immersed in the wash solution in a container, the wash solution is then discharged from the container with the barley remaining in the container, and the raw material solution is prepared using the barley separated from the wash solution. Alternatively, for example, the barley is immersed in the wash solution in a container, the barley is then taken out from the wash solution, and the raw material solution is prepared using the barley separated from the wash solution.

It should be noted that the amount of the wash solution discarded after washing the barley is not particularly limited as long as the amount falls within a range where transfer of an unfavorable flavor component originating from the barley to a beverage is reduced effectively. That is, the amount of the wash solution discarded may be, for example, 70% by volume or more, 80% by volume or more, or 90% by volume or more with respect to the amount of the wash solution after washing the barley and before discarding the wash solution.

The temperature at which the barley is washed is not particularly limited as long as the temperature falls within a range where effects provided by the washing of the barley is obtained, and the barley may be washed at a temperature of less than 40° C., for example. That is, for example, the barley is washed by immersing the barley in the wash solution at a temperature of less than 40° C.

When the barley is washed at a temperature of less than 40° C., the washing temperature is not particularly limited as long as the temperature is less than 40° C., and may be, for example, 30° C. or less, or 20° C. or less. When the barley is washed at a temperature of less than 40° C., the lower limit of the washing temperature is not particularly limited as long as the temperature falls within a range where effects provided by the washing of the barley are obtained, and the washing temperature may be 5° C. or more, for example.

When the washing temperature is adjusted to less than 40° C., for example, a loss of barley extract owing to the washing is effectively prevented.

When the washing temperature is less than 40° C., the time period for washing the barley (for example, the time period for immersing the barley in the wash solution at the temperature of less than 40° C.) is not particularly limited as long as the time period falls within a range where effects provided by the washing of the barley are obtained, and the time period may be, for example, 15 minutes or more and 360 minutes or less, more than 30 minutes and 300 minutes or less, or 60 minutes or more and 240 minutes or less.

In addition, in the method of the present invention, the barley may be washed at a temperature of 40° C. or more. That is, for example, the barley is washed by immersing the barley in the wash solution at a temperature of 40° C. or more.

When the barley is washed at a temperature of 40° C. or more, the washing temperature is not particularly limited as long as the temperature is 40° C. or more, and may be, for example, 50° C. or more, or 60° C. or more. When the barley is washed at a temperature of 40° C. or more, the upper limit of the washing temperature is not particularly limited as long as the temperature falls within a range where effects provided by the washing of the barley are obtained, and the washing temperature may be 80° C. or less, for example.

When the washing temperature is adjusted to 40° C. or more, for example, the barley is washed efficiently. In addition, when the washing temperature is adjusted to 40° C. or more, for example, the barley is softened efficiently to facilitate milling of the barley. In addition, when the washing temperature is adjusted to 40° C. or more, for example, germination of the barley owing to the washing is effectively prevented.

When the washing temperature is 40° C. or more, the time period for washing the barley (for example, the time period for immersing the barley in the wash solution at the temperature of 40° C. or more) is not particularly limited as long as the time period falls within a range where effects provided by the washing of the barley are obtained, and the time period may be, for example, 15 minutes or more and 360 minutes or less, more than 30 minutes and 300 minutes or less, or 60 minutes or more and 240 minutes or less.

In the method of the present invention, barley may be washed without germinating the barley so that the content of ferulic acid in a raw material solution prepared using the barley that is washed and ungerminated (more specifically, the content of ferulic acid in a raw material solution prepared using a raw material containing 100% by weight of washed and ungerminated barley) is 85% by weight or less, preferably 80% by weight or less, with respect to the content of ferulic acid in a raw material solution prepared using the barley that is unwashed and ungerminated (more specifically, the content of ferulic acid in a raw material solution prepared using a raw material containing 100% by weight of unwashed and ungerminated barley).

In addition, the barley may be washed so that the content of ferulic acid in a raw material solution prepared using the washed barley is, for example, 70% by weight or less, 60% by weight or less, 50% by weight or less, 40% by weight or less, or 30% by weight or less, with respect to the content of ferulic acid in a raw material solution prepared using the unwashed barley.

Further, the barley may be washed at a temperature of 40° C. or more so that the content of ferulic acid in a raw material solution prepared using the washed barley is, for example, 70% by weight or less, 60% by weight or less, 50% by weight or less, 40% by weight or less, or 30% by weight or less, in particular, 50% by weight or less, 40% by weight or less, or 30% by weight or less, with respect to the content of ferulic acid in a raw material solution prepared using the unwashed barley. In these cases, the temperature at which the barley is washed may be, for example, 50° C. or more or 60° C. or more.

It should be noted that ferulic acid originating from the barley is a precursor of 4-vinylguaiacol (4-VG) that is one of the unfavorable flavor components contained in a beverage. That is, in the raw material solution and the beverage, 4-VG may be produced by a chemical reaction of ferulic acid. Therefore, when the content of ferulic acid is reduced by washing the barley as described above, the flavor of the beverage is effectively improved.

The method of the present invention may include: washing barley that has not been milled; milling the washed barley; and preparing a raw material solution using a raw material containing the milled barley. That is, in this case, the method includes: washing barley that has not been milled without germinating the barley; discarding a wash solution after the washing of the barley; milling the washed barley; and preparing a raw material solution using the milled, washed, and ungerminated barley.

When the barley that has not been milled is washed, a loss of extract of the barley is effectively prevented compared to the case where milled barley is washed. In addition, the barley is softened by the washing, and hence milling of the washed barley is performed efficiently compared to milling of unwashed barley. In this regard, for example, when the barley is washed at a temperature of 50° C. or more (more preferably a temperature of 60° C. or more), the barley is softened efficiently.

In addition, the method of the present invention may further include drying the washed barley to prepare a raw material solution using a raw material containing the dried barley. That is, in this case, the method includes: washing barley without germinating the barley; discarding a wash solution after the washing of the barley; drying the washed and ungerminated barley; and preparing a raw material solution using the dried barley. It should be noted that, in this case, washed and milled barley may be dried, or washed barley that has not been milled may be dried.

When the washed barley is dried before use of the barley for preparation of the raw material solution, germination of the barley is prevented effectively. In addition, when the washed barley is dried, preservation or transportation of the washed barley is performed easily.

Further, in the method of the present invention, the washed barley may be used for preparation of the raw material solution without drying the washed barley. That is, in this case, washed and ungerminated barley is used for preparation of the raw material solution while the barley is still wet.

In addition, in the method of the present invention, the raw material solution is prepared using a raw material containing barley washed in advance as described above. Specifically, the raw material solution is prepared by, for example, mixing the raw material containing the barley with water (preferably hot water) and extracting components contained in the barley.

The amount of the barley used in the raw material is not particularly limited, and the raw material may contain, for example, 1% by weight to 100% by weight of the barley, or 10% by weight to 80% by weight of the barley.

The raw material containing the barley may include any other plant raw material. The other plant raw material is not particularly limited as long as the other plant raw material is used for production of a beverage. The raw material may include, for example, one or more kinds selected from the group consisting of grains (for example, one or more kinds selected from the group consisting of wheat, rice, and corn), beans, and potatoes that have not been germinated, and/or one or more kinds selected from the group consisting of grains (for example, one or more kinds selected from the group consisting of barley, wheat, rice, and corn), beans, and potatoes that have been germinated.

Specifically, the raw material solution may be prepared using, for example, a raw material containing barley and malt. As the malt, barley malt and/or wheat malt is preferably used. The barley malt and the wheat malt are obtained by germinating barley and wheat, respectively.

The raw material containing barley and malt may be a raw material containing barley and a malt extract. The malt extract is a malt extract obtained by extracting extract components containing a sugar component and a nitrogen component from malt. As the malt extract, a commercially available malt extract may be used.

When the raw material contains malt, the amount of the malt used in the raw material is not particularly limited, and the raw material may contain, for example, 0% by weight to 99% by weight of the malt, or from 20% by weight to 90% by weight of the malt.

That is, the raw material may contain, for example, 1% by weight to 100% by weight of the barley and 0% by weight to 99% by weight of the malt, or 10% by weight to 80% by weight of the barley and 20% by weight to 90% by weight of the malt.

When the raw material containing barley and malt is used, the raw material solution may be prepared through saccharification. In this case, the raw material solution is prepared by: mixing barley and malt with water (preferably hot water); and subjecting the resultant mixture to saccharification. The saccharification is performed by, for example, maintaining the mixture containing barley, malt, and water at a temperature (for example, from 30° C. to 80° C.) at which a digestive enzyme (for example, a starch-digestive enzyme or a protein-digestive enzyme) contained in the malt acts.

In addition, the raw material solution may be prepared using, for example, a raw material containing barley and hops. In this case, the raw material solution may be prepared using, for example, a raw material containing barley, malt, and hops.

When the raw material containing barley and hops is used, the raw material solution may be prepared by boiling a mixture containing the hops added. Further, when the raw material containing barley, malt, and hops is used, the raw material solution may be prepared by performing saccharification and then boiling a mixture containing the added hops. Specifically, the raw material solution may be prepared by: mixing barley and malt with water (preferably hot water); subjecting the resultant mixture to saccharification; adding hops to the mixture after the saccharification; and boiling the resultant mixture.

In addition, in the method of the present invention, the raw material solution prepared as described above is used to produce a beverage. A beverage according to one embodiment of the present invention (hereinafter referred to as "beverage of the present invention") is produced by the method of the present invention described above.

The beverage of the present invention may be, for example, an alcoholic beverage. The alcoholic beverage is a beverage having an ethanol content of 1% by volume or more (alcohol percentage of 1% or more). The content of ethanol in the alcoholic beverage is not particularly limited as long as the content is 1% by volume or more, and may be, for example, from 1% by volume to 20% by volume.

When the alcoholic beverage is produced by the method of the present invention, the method of the present invention may further include adding a yeast to the raw material solution prepared as described above to perform alcoholic fermentation. The alcoholic fermentation is performed by, for example, adding a yeast (for example, beer yeast) to the raw material solution and maintaining the mixture at a predetermined temperature (for example, from 0° C. to 40° C.) for a predetermined time period (for example, from 1 day to 14 days). The density of the yeast in a fermentation liquid at the beginning of the fermentation is not particularly limited, and may be, for example, from $1 \times 10^6$ cells/mL to $3 \times 10^9$ cells/mL.

Further, in the method of the present invention, maturation may be performed after the alcoholic fermentation. That is, in this case, the beverage is produced by adding a yeast to the raw material solution to perform alcoholic fermentation and performing maturation. The maturation is performed by further maintaining the fermentation liquid after the alcoholic fermentation at a predetermined temperature for a predetermined time period. The maturation precipitates insoluble matter in the fermentation liquid to remove turbidity and improves the flavor.

It should be noted that when the alcoholic beverage is produced by the method of the present invention, the method of the present invention is not limited to a method including performing the alcoholic fermentation as described above. That is, for example, the alcoholic beverage may be produced by, for example, mixing the raw material solution with ethanol or an aqueous solution containing ethanol. In this case, the method of the present invention may not include performing the alcoholic fermentation.

The beverage of the present invention may be, for example, a non-alcoholic beverage. The non-alcoholic beverage is a beverage having an ethanol content of less than 1% by volume. The content of ethanol in the non-alcoholic beverage is not particularly limited as long as the content is less than 1% by volume, and may be, for example, less than 0.5% by volume, less than 0.05% by volume, or less than 0.005% by volume.

When the non-alcoholic beverage is produced by the method of the present invention, for example, the non-alcoholic beverage may be produced without performing alcoholic fermentation. When the non-alcoholic beverage is produced by the method of the present invention without performing the alcoholic fermentation, the non-alcoholic beverage may be produced by, for example, mixing the raw material solution with any other raw material. In this case, as the other raw material, there may be used, for example, one or more kinds selected from the group consisting of sugars, dietary fibers, acidulants, pigments, flavoring agents, sweetening agents, and bittering agents.

The beverage of the present invention may be, for example, a sparkling beverage. The sparkling beverage is a beverage having foam properties including a foam-forming property and a foam-stability. That is, the sparkling beverage is, for example, a beverage containing carbon dioxide and having a foam-forming property, whereby a foam layer is formed on an upper part of a liquid when the beverage is poured into a vessel such as a glass, and a foam-stability, whereby the formed foam is held for a certain period of time or longer. The beverage of the present invention may be a sparkling alcoholic beverage or a sparkling non-alcoholic beverage.

It should be noted that as a method of imparting foam properties to the beverage of the present invention without performing the alcoholic fermentation, there may be used, for example, a method of bringing the raw material solution into contact with carbon dioxide (so-called carbonation) and/or a method of mixing the raw material solution with carbonated water.

In addition, the beverage of the present invention may be, for example, a non-sparkling beverage. The non-sparkling beverage is a beverage that does not have such foam properties as described above. The beverage of the present invention may be a non-sparkling non-alcoholic beverage or a non-sparkling alcoholic beverage.

According to the method of the present invention described above, a beverage having an efficiently improved flavor (beverage of the present invention) is produced. That is, the method of the present invention includes: washing barley without germinating the barley; discarding a wash solution after the washing; preparing a raw material solution using the washed and ungerminated barley separated from the wash solution; and producing a beverage using the raw material solution, and hence transfer of an unfavorable flavor component originating from the barley to the beverage is reduced effectively.

As a result, according to the method of the present invention, a beverage having an improved flavor is produced compared to the case of using unwashed and ungerminated barley instead of the washed and ungerminated barley.

Therefore, the method of the present invention may be, for example, a method of improving a flavor of a beverage produced using a raw material containing barley, in which the flavor of the beverage is improved by using, as the barley, washed and ungerminated barley compared to the case of using unwashed and ungerminated barley instead of the washed and ungerminated barley.

The improvement of the flavor of the beverage by the method of the present invention is not particularly limited as long as the unfavorable flavor originating from barley in the beverage is reduced, and may include, for example, reduction of discordant taste originating from the barley in the beverage.

Hereinafter, specific examples according to those embodiments will be described.

Example 1

Washing of Barley

Barley was washed without germinating the barley, and the wash solution was discarded after the washing of the barley while the barley after the washing was collected. That is, as the barley to be washed, barley from which 10% of the hull had been removed was used in Example 1-1, and barley from which no hull had been removed was used in Example 1-2. In both Example 1-1 and Example 1-2, water was used as the wash solution and ungerminated barley that had not been milled was washed.

Specifically, first, barley was immersed in water at 80° C. in a tank. Subsequently, 15 minutes after the beginning of the immersion, the barley was collected from the tank. Further, the collected barley was milled. The collected barley was not germinated. The water remaining in the tank after the collection of the barley was discarded and was not used for preparation of a raw material solution to be described later. It should be noted that the water content of the barley after the washing at 80° C. was about 67% by weight.

[Preparation of Raw Material Solution]

A raw material solution was prepared using a raw material containing the washed and ungerminated barley. That is, the raw material solution was prepared using a raw material containing the washed barley, malt, and hops.

Specifically, first, hot water at 50° C. was added to the milled and washed barley and milled barley malt, and the resultant mixture was maintained at 65° C. to perform saccharification. Subsequently, the hull of the barley malt was removed from the mixture after the saccharification. After that, hops were added to the mixture, and the resultant was boiled. The mixture after the boiling was obtained as the raw material solution. It should be noted that the amount of the barley used in the raw material was 50% by weight, and the amount of the barley malt used in the raw material was 50% by weight.

[Production of Beverage]

A yeast was added to the raw material solution to perform alcoholic fermentation, thereby producing a beverage. That is, a beer yeast was added to the raw material solution prepared as described above to perform alcoholic fermentation, followed by maturation. Then, the fermentation liquid after the maturation was filtered and sterilized.

Thus, in Example 1-1 and Example 1-2, sparkling alcoholic beverages were produced using the washed and ungerminated barley. Meanwhile, in Comparative Example 1, a sparkling alcoholic beverage was produced using unwashed and ungerminated barley under the same conditions as those on Example 1-1 except that the barley was not washed. The three kinds of sparkling alcoholic beverages had ethanol contents of about 5% by volume.

[Sensory Test]

The beverages were evaluated for their flavors. That is, the three kinds of beverages produced as described above were each subjected to a sensory test by eight experienced panelists. In the sensory test, the flavors were evaluated on a three-point scale: A, B, and C ("A" is the highest score).

[Results]

The results of evaluation of the beverages for their flavors are shown in FIG. 1. As shown in FIG. 1, the beverages of Example 1-1 and Example 1-2 produced using the washed barley were evaluated as having excellent flavors compared to the beverage of Comparative Example 1 produced using the unwashed barley. That is, four panelists evaluated the beverage of Comparative Example 1 as "C", and on the other hand, only one panelist evaluated the beverage of Example 1-1 as "C" and no panelist evaluated the beverage of Example 1-2 as "C".

In addition, the beverage produced in Example 1-2 was evaluated as having a more excellent flavor compared to the beverage produced in Example 1-1. That is, only one panelist evaluated the beverage of Example 1-1 as "A", while seven panelists evaluated the beverage of Example 1-2 as "A".

Further, as an effect of improving the flavor, for example, reduction of discordant taste was confirmed. That is, as shown in FIG. 1, four panelists evaluated the beverage of Comparative Example 1 as a beverage having discordant taste, and on the other hand, two panelists evaluated the beverage of Example 1-1 as a beverage having discordant taste, and no panelist evaluated the beverage of Example 1-2 as a beverage having discordant taste.

Example 2

In Example 2, a sparkling alcoholic beverage was produced using washed and ungerminated barley in the same manner as in Example 1-2 above except that washing of barley was performed by immersing the barley in water at 20° C. in a tank and collecting the barley from the tank 60 minutes after the beginning of the immersion. It should be noted that the water content of the barley after the washing at 20° C. was less than 30% by weight. In addition, in Comparative Example 2, a sparkling alcoholic beverage was produced using unwashed and ungerminated barley under the same conditions as those of Example 2 except that the barley was not washed. Then, the two kinds of beverages were each subjected to a sensory test by seven experienced panelists in the same manner as in Example 1 above.

The results of the evaluation for the flavors of the beverages are shown in FIG. 2. As shown in FIG. 2, the beverage of Example 2 produced using the washed barley was evaluated as having an excellent flavor compared to the beverage of Comparative Example 2 produced using the unwashed barley.

That is, no panelist evaluated the beverage of Comparative Example 2 as "A", while six panelists evaluated the beverage of Example 2 as "A". In addition, four panelists evaluated the beverage of Comparative Example 2 as a beverage having discordant taste, while no panelist evaluated the beverage of Example 2 as a beverage having discordant taste.

Example 3

Preparation of Raw Material Solution

In Example 3-1, barley was immersed in water at 80° C. for 15 minutes to wash the barley without germinating the barley, in the same manner as in Example 1-2 above, and a raw material solution was prepared using a raw material containing 100% by weight of the washed and ungerminated barley.

In Example 3-2, barley was immersed in water at 20° C. for 60 minutes to wash the barley without germinating the barley, in the same manner as in Example 2 above, and a raw material solution was prepared using a raw material containing 100% by weight of the washed and ungerminated barley.

In Example 3-3, a raw material solution was prepared using a raw material containing 100% by weight of the washed and ungerminated barley, in the same manner as in Example 3-1 above except that an aqueous solution of sodium hydroxide (0.03%) at 20° C. was used instead of water at 80° C.

Further, in Comparative Example 3, a raw material solution was prepared using a raw material containing 100% by weight of unwashed and ungerminated barley under the same conditions as those of Example 3-1 above except that the barley was not washed.

[Measurement of Content of Ferulic Acid]

The four kinds of raw material solutions prepared as described above were each subjected to measurement of the content of ferulic acid. The contents of ferulic acid in the raw material solutions were measured by liquid chromatography with a mass spectrometer (LC/MS). Specifically, first, a part of each of the raw material solutions prepared as described above was collected as a sample, and the sample was treated with a 0.45-μm filter. After that, analysis was carried out by using a LC/MS analyzer (LC: Agilent 1100, Agilent Technologies/MS: ZQ, Waters) provided with a column (X Bridge C18, 3.5 μm, 2.1 mm, 150 mm, BEH Technology) under the following conditions: sample injection volume: 2 μL, mobile phase A: 0.1% aqueous solution of acetic acid, mobile phase B: methanol, mobile phase flow rate: 0.25 mL/min, and quantitative ion: 193 m/z. Its gradient program (mobile phase B(%)) was as follows: 0 min to 2 min: 1%, 2 min to 5 min: 75%, 5 min to 12 min: 95%, 12 min to 14 min: 95%, 14 min to 15 min: 1%.

[Results]

The results of measurement of the contents of ferulic acid in the raw material solutions are shown in FIG. 3. As shown in FIG. 3, the contents of ferulic acid in the raw material solutions prepared using the washed barley in Example 3-1, Example 3-2, and Example 3-3 (1.1 ppm, 3.7 ppm, and 2.7 ppm, respectively) were significantly smaller than the content of ferulic acid in the raw material solution prepared using the unwashed barley in Comparative Example 3 (4.8 ppm). That is, the use of the washed barley effectively reduced the contents of ferulic acid in the raw material solutions compared to the case of using the unwashed barley.

Specifically, in Example 3-1, Example 3-2, and Example 3-3, the contents of ferulic acid in the raw material solutions were reduced to about 23% by weight, about 77% by weight, and about 56% by weight, respectively, with respect to that in Comparative Example 3. Here, ferulic acid is a precursor of 4-VG that is one of the unfavorable flavor components contained in a beverage. Therefore, it is considered that use of washed barley to prepare a raw material solution effectively improves the flavor of a beverage produced using the raw material solution compared to the case of using unwashed barley.

The invention claimed is:

1. A method of producing a beverage, the method comprising:
    reducing ferulic acid by washing barley with a wash solution without germinating the barley to produce washed and ungerminated barley;
    discarding the wash solution from the washed and ungerminated barley after the washing;
    extracting ungerminated components from the washed and ungerminated barley to prepare a raw material solution with a raw material comprising the washed and ungerminated barley; and
    preparing the beverage with the raw material solution,
    wherein the final beverage includes the ungerminated components,
    wherein the barley is washed at a temperature of 40° C. or more, and
    wherein the barley is washed such that the raw material solution prepared comprises ferulic acid at a content of 85% by weight or less, relative to the content of ferulic acid in a raw material solution prepared with unwashed and ungerminated barley.

2. The method according to claim 1, wherein the barley has not been milled and the method further comprises: milling the barley after the washing.

3. A method of improving a flavor of a beverage produced from a raw material comprising barley, the method comprising:
    reducing ferulic acid by washing barley with a wash solution without germinating the barley to produce washed and ungerminated barley;
    discarding the wash solution from the washed and ungerminated barley after the washing;
    preparing a raw material solution with a raw material comprising the washed and ungerminated barley; and
    preparing the beverage with the raw material solution,
    wherein the final beverage includes a component extracted from the washed and ungerminated barley,
    wherein the barley is washed at a temperature of 40° C. or more, and
    wherein the barley is washed such that the raw material solution prepared comprises ferulic acid at a content of 85% by weight or less, relative to the content of ferulic acid in a raw material solution prepared with unwashed and ungerminated barley.

4. The method according to claim 1, wherein the preparing of the raw material solution comprises adding water to the raw material.

5. The method according to claim 1, wherein the raw material further comprises malt, and the preparing of the raw material solution comprises adding water to the raw material.

6. The method according to claim 1, wherein the beverage is an alcoholic beverage, and the preparing of the beverage comprises performing alcoholic fermentation of the raw material solution.

7. The method according to claim 3, further comprising: adding water to the raw material to prepare a raw material solution; and performing alcoholic fermentation of the raw material solution to prepare the beverage, which is an alcoholic beverage.

8. A method of producing a beverage, the method comprising:
    reducing ferulic acid by washing barley with a wash solution without germinating the barley to produce washed and ungerminated barley;
    separating the washed and ungerminated barley from the wash solution after the washing;
    preparing a raw material solution with a raw material comprising the washed and ungerminated barley separated from the wash solution; and
    preparing the beverage with the raw material solution,
    wherein the final beverage includes a component extracted from the washed and ungerminated barley,
    wherein the barley is washed at a temperature of 40° C. or more, and
    wherein the barley is washed such that the raw material solution prepared comprises ferulic acid at a content of 85% by weight or less, relative to the content of ferulic acid in a raw material solution prepared with unwashed and ungerminated barley.

9. The method according to claim 8, wherein the washing is performed for 15 to 360 minutes.

10. The method according to claim 8, wherein the barley subjected to the washing is barley from which at least a part of the hull has been removed.

11. The method according to claim 1, wherein the raw material solution prepared comprises ferulic acid at an amount of 50% by weight or less, relative to the content of ferulic acid in a raw material solution prepared with unwashed and ungerminated barley.

12. The method according to claim 3, wherein the raw material solution prepared comprises ferulic acid at an amount of 50% by weight or less, relative to the content of ferulic acid in a raw material solution prepared with unwashed and ungerminated barley.

13. The method according to claim 8, wherein the raw material solution prepared comprises ferulic acid at an amount of 50% by weight or less, relative to the content of ferulic acid in a raw material solution prepared with unwashed and ungerminated barley.

14. The method according to claim 1, wherein the raw material solution prepared comprises ferulic acid at an amount of 30% by weight or less, relative to the content of ferulic acid in a raw material solution prepared with unwashed and ungerminated barley.

15. The method according to claim 3, wherein the raw material solution prepared comprises ferulic acid at an amount of 30% by weight or less, relative to the content of ferulic acid in a raw material solution prepared with unwashed and ungerminated barley.

16. The method according to claim 8, wherein the raw material solution prepared comprises ferulic acid at an amount of 30% by weight or less, relative to the content of ferulic acid in a raw material solution prepared with unwashed and ungerminated barley.

17. The method according to claim 1, wherein the barley is washed at a temperature of 60° C. or more.

18. The method according to claim 3, wherein the barley is washed at a temperature of 60° C. or more.

19. The method according to claim 8, wherein the barley is washed at a temperature of 60° C. or more.

* * * * *